US012596432B2

(12) United States Patent (10) Patent No.: US 12,596,432 B2
Ovadia (45) Date of Patent: Apr. 7, 2026

(54) METHODS CIRCUITS DEVICES SYSTEMS APPLICATIONS AND FUNCTIONALLY ASSOCIATED MACHINE EXECUTABLE CODE FOR DIGITAL DEVICE DISPLAY ADJUSTMENT

(71) Applicant: Gabriel Ovadia, Hagor (IL)

(72) Inventor: Gabriel Ovadia, Hagor (IL)

( * ) Notice: Subject to any disclaimer, the term of this patent is extended or adjusted under 35 U.S.C. 154(b) by 0 days.

(21) Appl. No.: 18/843,729

(22) PCT Filed: Mar. 22, 2024

(86) PCT No.: PCT/IL2024/050299
§ 371 (c)(1),
(2) Date: Sep. 4, 2024

(87) PCT Pub. No.: WO2024/194875
PCT Pub. Date: Sep. 26, 2024

(65) Prior Publication Data
US 2026/0003426 A1 Jan. 1, 2026

Related U.S. Application Data

(60) Provisional application No. 63/530,531, filed on Aug. 3, 2023, provisional application No. 63/454,113, filed on Mar. 23, 2023.

(51) Int. Cl.
*G06F 3/01* (2006.01)
*G06T 3/40* (2024.01)
*G06V 40/18* (2022.01)
*G06V 40/20* (2022.01)

(52) U.S. Cl.
CPC ............... *G06F 3/013* (2013.01); *G06T 3/40* (2013.01); *G06V 40/193* (2022.01); *G06V 40/197* (2022.01); *G06V 40/20* (2022.01)

(58) Field of Classification Search
None
See application file for complete search history.

(56) References Cited

U.S. PATENT DOCUMENTS

| | | | |
|---|---|---|---|
| 2013/0127980 A1* | 5/2013 | Haddick | G06F 3/013 348/14.08 |
| 2016/0012643 A1 | 1/2016 | Kezele et al. | |
| 2020/0004052 A1 | 1/2020 | Antaki et al. | |
| 2020/0241302 A1 | 7/2020 | Osterhout et al. | |
| 2021/0227203 A1 | 7/2021 | Zhou | |
| 2021/0294413 A1 | 9/2021 | Manduchi | |
| 2021/0349536 A1* | 11/2021 | Crispin | A61B 3/112 |
| 2023/0308770 A1* | 9/2023 | Li | G06F 3/017 |

OTHER PUBLICATIONS

Hua et al., "Calibration of a head-mounted projective display for augmented reality systems"; Published in: Proceedings. International Symposium on Mixed and Augmented Reality;Date of Conference: Oct. 1, 2002.

* cited by examiner

*Primary Examiner* — Ifedayo B Iluyomade
(74) *Attorney, Agent, or Firm* — Vladimir Sherman

(57) ABSTRACT

Disclosed is a system for digital device display adjustment to facilitate the dynamic, user and usage specific, device outputs and display adjustment. One or more device output and display features may be adjusted in accordance with user and/or usage parameters—provided by the user, estimated by the system, or detected by it.

16 Claims, 15 Drawing Sheets

Mobile Device

Mobile Device Application

Display Distance Estimator d

Display Device Sensor/Camera/LIDAR/SONAR/RADAR; Sensor-Circuitry/Signal-Amplifier/ADC; Image/Feature (face/eyes) Detection/Extraction Engine d Mobile Device User vLens shape vLens Profile Regular Screen

Adjusted Magnification

Magnification Grid

METHODS CIRCUITS DEVICES SYSTEMS APPLICATIONS AND FUNCTIONALLY ASSOCIATED MACHINE EXECUTABLE CODE FOR DIGITAL DEVICE DISPLAY ADJUSTMENT

FIELD OF THE INVENTION

The present invention generally relates to the fields Digital Accessibility and Personalized Digital User Interfaces. More specifically, the present invention relates to methods circuits devices systems and functionally associated machine executable code for digital device display adjustment.

BACKGROUND

Various display settings of most personal and digital computerized devices can be adjusted by their user through a display settings interface. Some devices enable multiple user profiles/accounts, each with their specific display settings.

There remains a need, in the fields of digital accessibility and personalized digital user interfaces, for solutions facilitating dynamic, user and usage specific, device outputs presentation and displayed content adjustment.

SUMMARY OF THE INVENTION

Embodiments of the present invention include methods circuits devices systems and functionally associated machine executable code for digital device display adjustment.

A system for digital device display adjustment, in accordance with embodiments, may facilitate the dynamic setting of one or more display features and characteristics of a digital user device, based on collected user and/or usage parameters. A user device application may interface with and receive user and/or usage parameters data collected by, one or more sensors, integral, or otherwise functionally associated, with the user device. The user device application may further interface with and receive user entered/provided data from one or more user device input components, such as the device's keyboard, microphone and/or camera/scanner.

User and/or usage parameters, in accordance with embodiments, may include any combination of: (1) parameters for generating an estimate, or multiple sequential estimates, of a distance between the device's display/screen and the face or eyes of the current user: (2) parameters indicative of the device user's visual capabilities, such as her optical subscription data; and/or (3) parameters for generating an indication of the detection of glasses or lenses being worn by the device user, or the absence of such a detection.

Device display features and characteristics adjustments, in accordance with embodiments, may be designed to imitate the view through specific prescription glasses lenses types, such as: single vision lenses, bifocal lenses, trifocal lenses, progressive lenses, toric lenses and/or prism lenses. User face/eyes distance estimates made by the system may be used to tune the display features and characteristics adjustments to further imitate the view through a specific/given/selected type of lens, at the estimated face/eyes to display/screen distance.

According to some embodiments, one or more images of the user, acquired by the user device's camera, may be analyzed to estimate the distance between the user's face/ eyes and the device's camera, that is at a substantially similar distance as the device's display/screen.

According to some embodiments, information in regard to the device user's visual capabilities, such as her optical subscription data, may be entered, scanned (e.g. from a prescription), and/or retrieved (e.g. from an accessible medical/optical records database) through the application installed on the user's digital device. The optical prescription/records/parameters of the user may be factored/analyzed to affect/match the selection and selected-levels of the device display features and characteristics adjustments, made by the system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

Figure 1A:
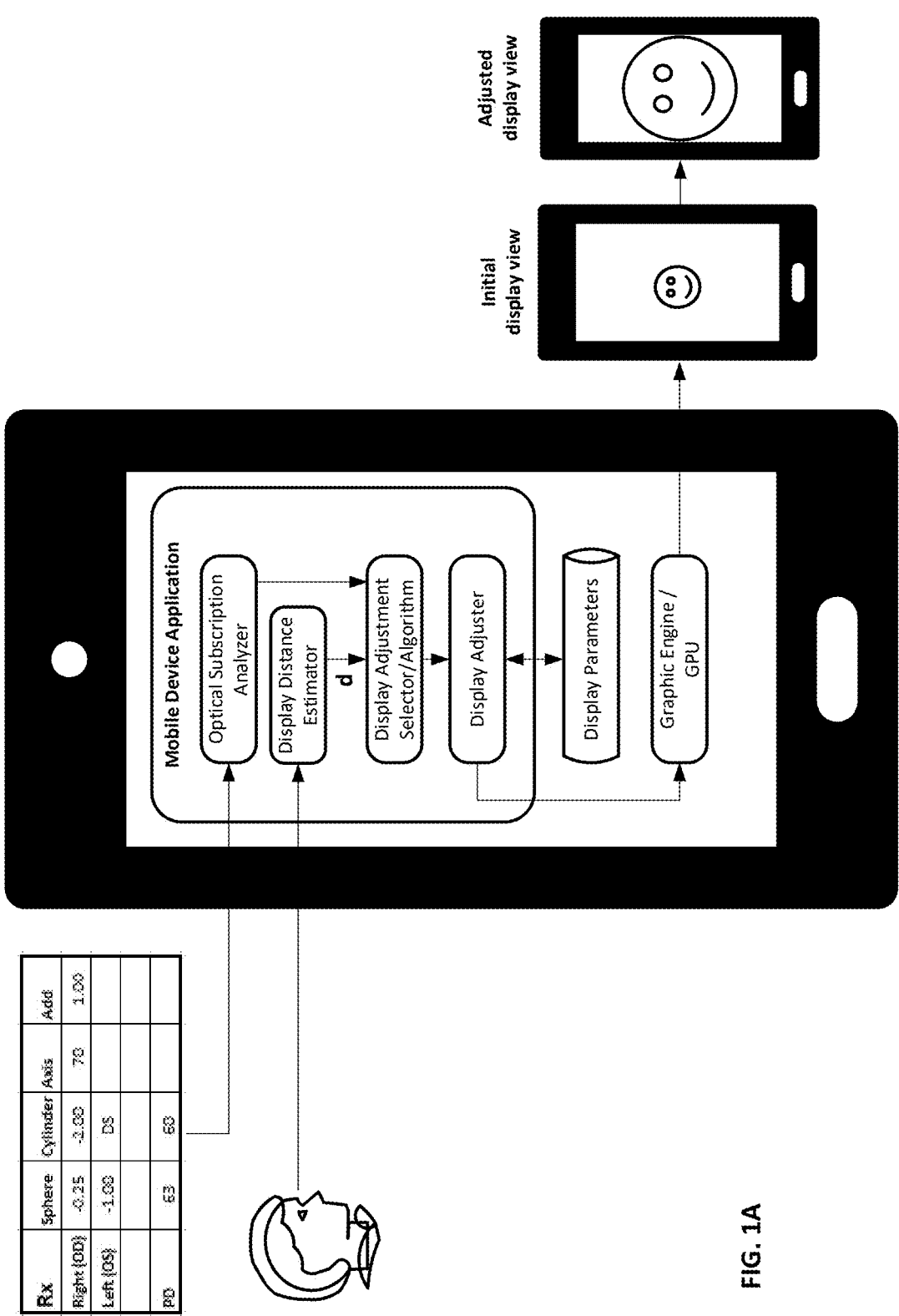
FIG. 1A is a block diagram of an exemplary system for dynamic, user and usage specific, device outputs and display adjustment, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals or element labeling may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention and is not intended to limit the invention to the specific embodiments illustrated by the figures or description below.

Embodiments of the present invention include methods circuits devices systems and functionally associated machine executable code for digital device display adjustment.

A system for digital device display adjustment, in accordance with embodiments, may facilitate the dynamic setting of one or more display features and characteristics of a digital user device, based on collected user and/or usage parameters. A user device application may interface with and receive user and/or usage parameters data collected by, one or more sensors, integral, or otherwise functionally associated, with the user device. The user device application may further interface with and receive user entered/provided data from one or more user device input components, such as the device's keyboard, microphone and/or camera/scanner.

User and/or usage parameters, in accordance with embodiments, may include any combination of: (1) parameters for generating an estimate, or multiple sequential estimates, of a distance between the device's display/screen and the face or eyes of the current user: (2) parameters indicative of the device user's visual capabilities, such as her optical subscription data; and/or (3) parameters for generating an indication of the detection of glasses or lenses being worn by the device user, or the absence of such a detection.

Device display features and characteristics adjustment, in accordance with embodiments, may include any type or combination of modification, removal and/or addition, of user visible output, presented on the display of the device. For example, any combination of adjustments may be made to the display's: zoom level, focus, character & image size, brightness level, contrast and/or saturation: adjustments may be: made to the entire display, made to a specific area/part/ section of the display, overlaid on the currently displayed image, replacing the currently displayed image and/or overlaid and partially transparent to the currently displayed image.

Device display features and characteristics adjustments, in accordance with embodiments, may be designed to imitate the view through specific prescription glasses lenses types, such as: single vision lenses, bifocal lenses, trifocal lenses, progressive lenses, toric lenses and/or prism lenses. User face/eyes distance estimates made by the system may be used to tune the display features and characteristics adjustments to further imitate the view through a specific/ given/selected type of lens, at the estimated face/eyes to display/screen distance.

According to some embodiments, an estimate, or multiple sequential estimates, of a distance between the digital device's display/screen and the face or eyes of the current user may be facilitated by one or more display distance measurement and calculation components integrated with the digital device, or functionally associated therewith. For example, any combination of the following components/ devices/sensors may be utilized: a camera, a Light Detection and Ranging (LIDAR), a Sound Detection and Ranging (SONAR) and/or Radio Detection and Ranging (RADAR). The display distance measurement and calculation components may further include and/or be functionally associated with any combination of sensor-control-circuitries, signal amplifiers, analog-to-digital converters (ADC) and/or any other electronic, hardware or software implemented control-logic/component.

According to some embodiments, one or more images of the user, acquired by the user device's camera, may be analyzed to estimate the distance between the user's face/ eyes and the device's camera, that is at a substantially similar distance as the device's display/screen. For example, the following equation/formula may be utilized to calculate a distance estimate based on acquired image(s) and device camera parameters:

$$\text{Distance to the object (mm)} =$$
$$[f(\text{mm}) * \text{real height (mm)} * \text{image height (pixels)}] /$$
$$[\text{object height (pixels)} * \text{sensor height (mm)}]$$

Wherein, the Distance to the object (i.e. the user's face/ eyes/head) in millimeters, equals to: [the camera's Focal Length in millimeters, multiplied by the Real Height of the object (i.e. the user's face/eyes/head) in millimeters, multiplied by the Image Height in pixels] divided by [the Object Height in pixels, multiplied by the camera's Sensor Height in millimeters]. Height parameters in the equation may be substituted by, and/or combined with, Width parameters and/or Diagonal parameters of the image, the object and the camera sensor.

In addition, outputs from: wireless data network triangulation-based positioning components, GPS positioning components, user/device posture and orientation measuring sensors (e.g. gyro, accelerometer) and/or device ambient conditions measuring sensors (e.g. thermometer, light sensor, microphones to measure wind/sound)—may be factored/analyzed to derive, or tune, an estimated distance between the display of the digital device and the face or eyes of the user, and/or to otherwise affect the selection and selected-levels of the device display features and characteristics adjustments, made by the system.

According to some embodiments, information in regard to the device user's visual capabilities, such as her optical subscription data, may be entered, scanned (e.g. from a prescription), and/or retrieved (e.g. from an accessible medical/optical records database) through the application installed on the user's digital device. The optical prescription/records/parameters of the user may be factored/analyzed to affect/match the selection and selected-levels of the device display features and characteristics adjustments, made by the system.

According to some embodiments, an indication of the detection of glasses or lenses being worn by the current device user, or the absence of such an indication, may be facilitated by one or more image analysis and/or feature extraction components integrated, or functionally associated, with the digital device and having access to its camera collected images. Such components may implement any combination of image processing methods such as those used for: border detection, background removal, face features detection and recognition and/or other associated tasks. According to some embodiments, a neural network model may be designed, configured, trained, and used, to classify analyzed user images to glasses/lenses wearing current-users and non-glasses/lenses wearing current-users: the model may be trained using multiple human face images, labelled as glasses/lenses-wearing and not glasses/lenses-wearing.

According to some embodiments, upon detection of the current user wearing glasses/lenses, some or all of the device display features and characteristics adjustments to be made by the system may be cancelled, or if already made, reversed (e.g. user wore her glasses during use).

According to some embodiments, any of the user and/or usage parameters described herein in the context of device display adjustments, may be likewise applicable to the adjustment and tunning of other output components of the digital user device. For example, an estimate of the distance between the user's face/eyes and the display of the device—as described herein—may be utilized for the adjustment of the device's volume, wherein as the distance increases so does the device's sound output volume, and vice versa.

Reference is now made to FIG. 1A, where there is shown a block diagram of an exemplary system for dynamic, user and usage specific, device outputs and display adjustment, in accordance with some embodiments of the present invention. In the figure, a Mobile Device Application is shown to include an Optical Subscription Analyzer to receive and analyze a user's optical prescription and a Display Distance Estimator to estimate the distance between the device's display and the user's face/eyes. The estimated distance and extracted relevant subscription data are relayed to a Display Adjustment Selector/Algorithm to determine on one or more specific device display adjustments, matching the prescription data and the estimated distance—to improve the user's understanding of, and interface and experience with, the device's visual output and displayed content.

The selected device display adjustments are relayed to a Display Adjuster for referencing adjustment-related display parameters and, generating and relaying respective graphic display/presentation commands to the digital user device's Graphic-Engine/Display-Driver/Graphic-Processing-Unit (GPU). In the figure, an Initial display view is shown to be adjusted—zoomed-in/enlarged—in response to the Display Adjuster's commands.

Figure 1B:
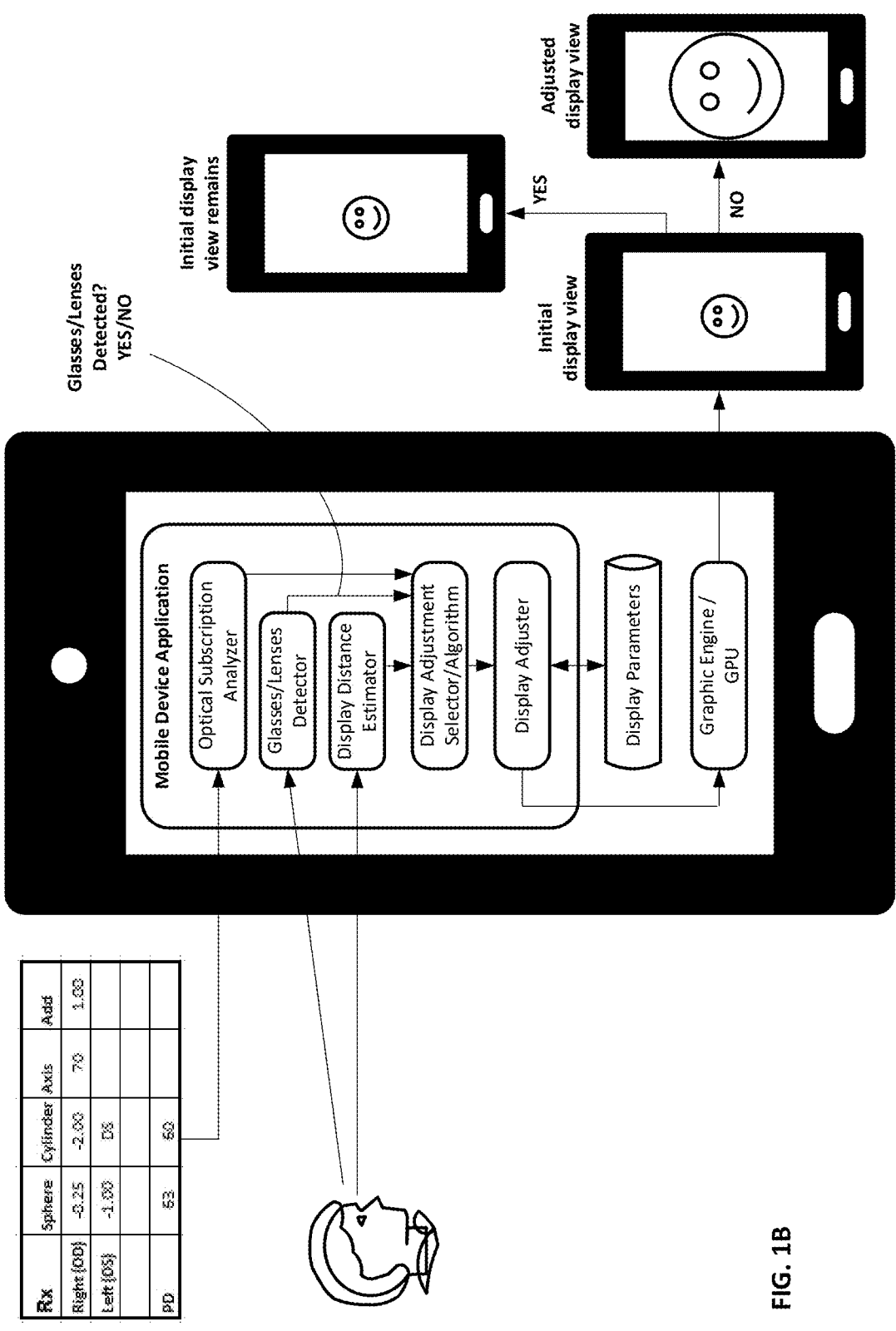
FIG. 1B is a block diagram of an exemplary system for dynamic, user and usage specific, device outputs and display adjustment, in accordance with some embodiments of the present invention, wherein the system include a glasses/lenses detector.

Reference is now made to FIG. 1B, where there is shown a block diagram of an exemplary system for dynamic, user and usage specific, device outputs and display adjustment, in accordance with some embodiments of the present invention, wherein the system includes a glasses/lenses detector. In the figure, the Mobile Device Application is shown to include a Glasses/Lenses Detector to determine whether the current device user is wearing glasses/contact-lenses or not. An indication of the glasses/lenses status (wearing/not-wearing) is relayed to the Display Adjustment Selector/Algorithm. If the indication of glasses/lenses is negative, the Selector/Algorithm proceeds with display adjustments to match the received prescription and distance data (in the example of the figure-"Adjusted display view"); conversely, if the indication of glasses/lenses is positive, the Selector/Algorithm may change/lessen/minimize, or cancel altogether, the execution of display adjustments to match the received prescription and distance data (in the example of the figure-"Initial display view remains").

Figure 2:
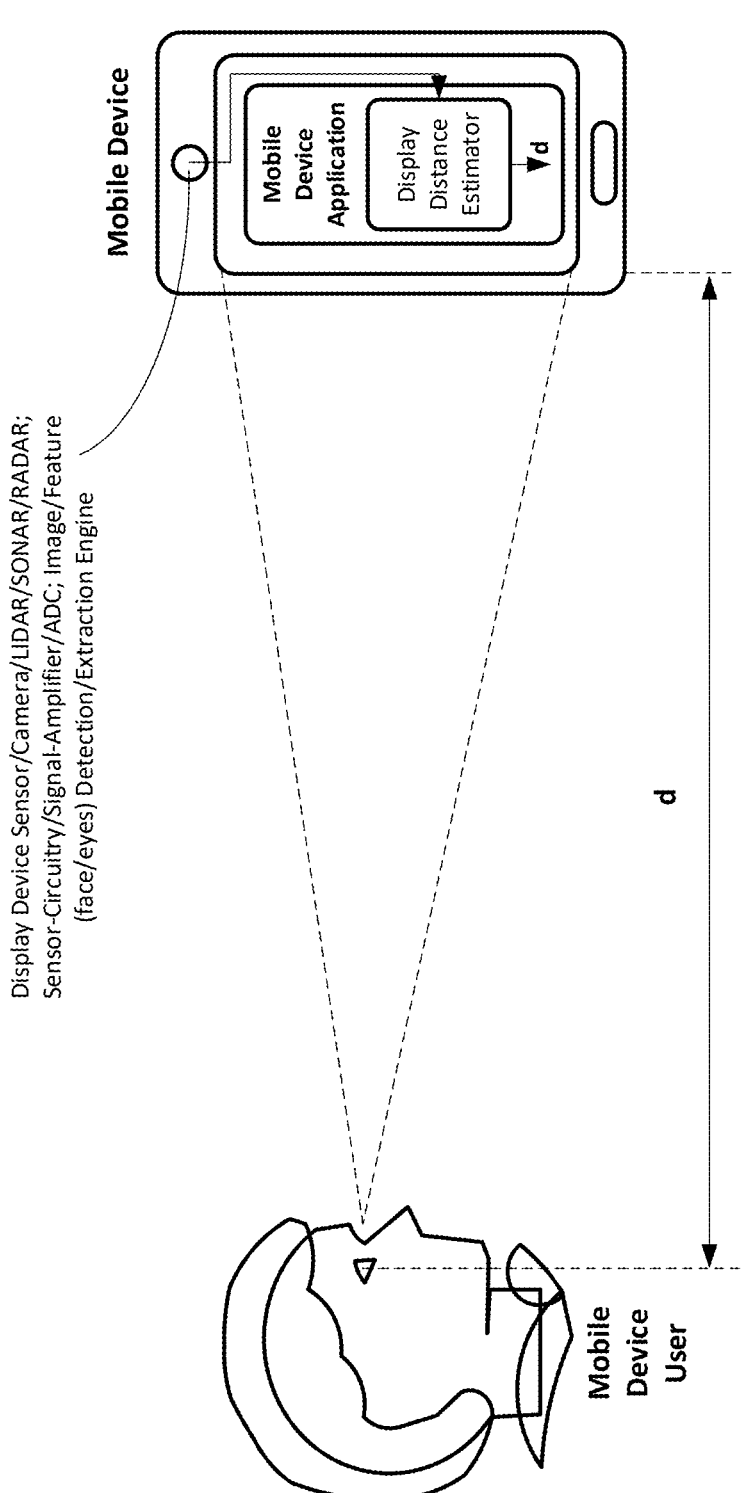
FIG. 2 is a diagram depicting the operation of an exemplary display distance estimator of a system for dynamic, user and usage specific, device outputs and display adjustment, in accordance with some embodiments of the present invention.

Reference is now made to FIG. 2, where there is shown a diagram depicting the operation of an exemplary display distance estimator of a system for dynamic, user and usage specific, device outputs and display adjustment, in accordance with some embodiments of the present invention. In the figure, the mobile user device is shown to include a Sensor/Camera/LIDAR/SONAR/RADAR component for acquiring user face/eyes distance indicative data/streams/signals. Collected data/streams/signals are relayed to the Display Distance Estimator of the Device's Application, for it to generate/calculate and output an estimate of the distance-'d'-between the device's display and the face/eyes of the user.

Figure 3:
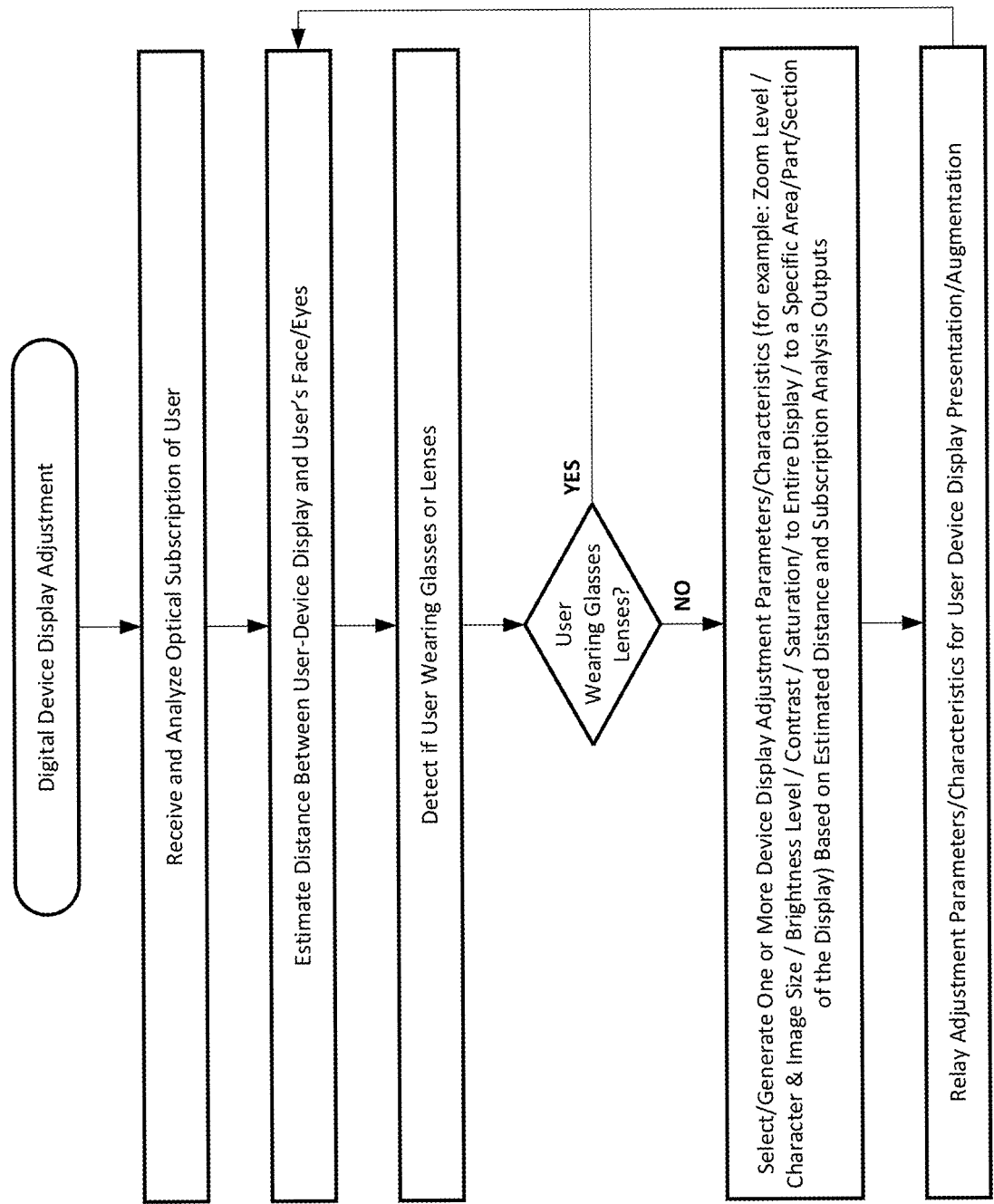
FIG. 3 is a flowchart showing the main steps of an exemplary process executed by a system for dynamic, user and usage specific, device outputs and display adjustment, in accordance with some embodiments of the present invention.

Reference is now made to FIG. 3, where there is shown a flowchart of the main steps of an exemplary process executed by a system for dynamic, user and usage specific, device outputs and display adjustment, in accordance with some embodiments of the present invention. In the figure, the following process steps are shown: (1) Receive and Analyze Optical Subscription of User: (2) Estimate Distance Between User-Device Display and User's Face/Eyes: (3) Detect if User Wearing Glasses or Lenses: (4) If User Wearing Glasses/Lenses then return to step 2, else (5) Select/Generate One or More Device Display Adjustment Parameters/Characteristics (for example: Zoom Level/Character & Image Size/Brightness Level/Contrast/Saturation/to Entire Display/to a Specific Area/Part/Section of the Display) Based on Estimated Distance and Subscription Analysis Outputs; and (6) Relay Adjustment Parameters/Characteristics for User Device Display Presentation/Augmentation.

Figures 4A, 4B:
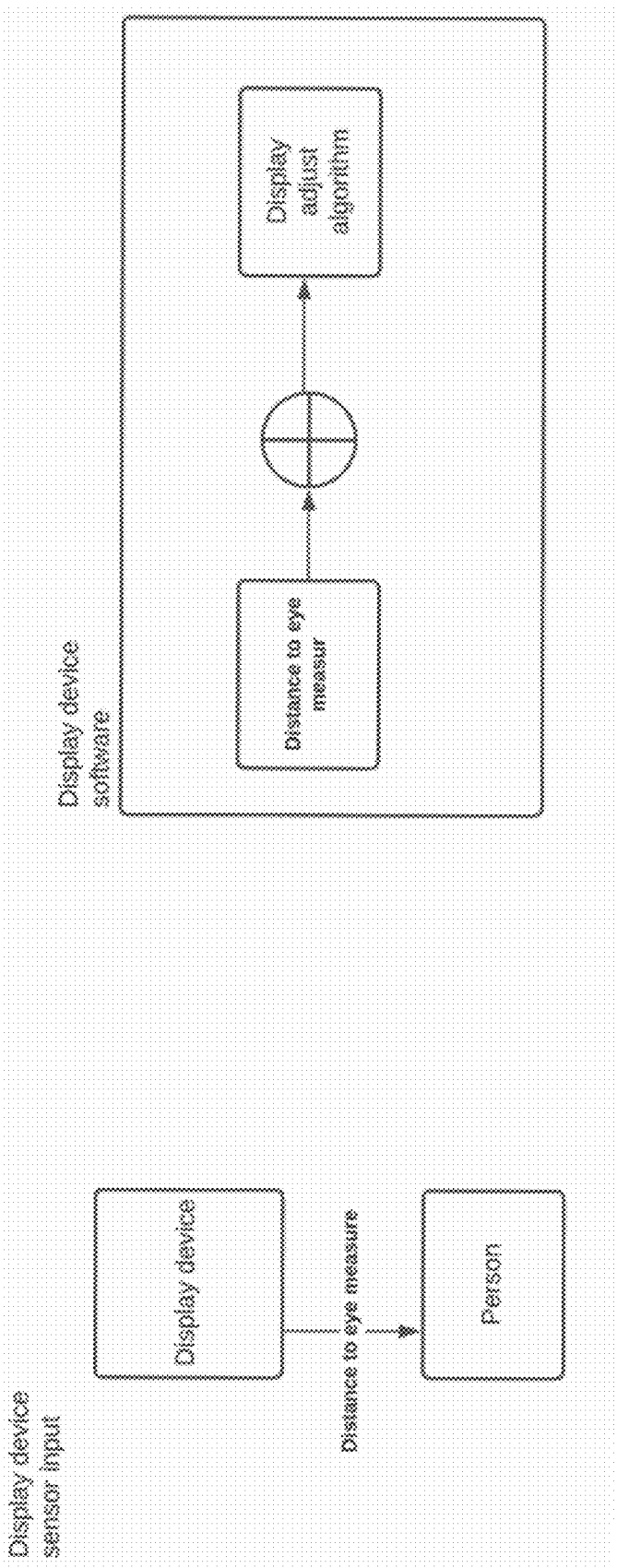
FIG. 4A is a block diagram depicting the main components and operation of an exemplary device-display to user-eye distance estimator/measurement-sensor, of a system for dynamic, user and usage specific, device outputs and display adjustment, in accordance with some embodiments of the present invention.
FIG. 4B is a block diagram depicting the main components and operation of an exemplary display device logic/circuit/software/algorithm for selecting/determining and triggering a device display adjustment based on an estimated/measured distance between the device's display to the device user's eye, of a system for dynamic, user and usage specific, device outputs and display adjustment, in accordance with some embodiments of the present invention.

Reference is now made to FIG. 4A, where there is shown a block diagram depicting the main components and operation of an exemplary device-display to user-eye distance estimator/measurement-sensor, of a system for dynamic, user and usage specific, device outputs and display adjustment, in accordance with some embodiments of the present invention; and Reference is now made to FIG. 4B, where there is shown a block diagram depicting the main components and operation of an exemplary display device logic/circuit/software/algorithm for selecting/determining and triggering a device display adjustment based on an estimated/measured distance between the device's display to the device user's eye, of a system for dynamic, user and usage specific, device outputs and display adjustment, in accordance with some embodiments of the present invention.

A system for digital device display adjustment, in accordance with embodiments, may facilitate the dynamic setting/transformation of one or more display features and characteristics of a digital user device, based on collected user and/or usage parameters.

According to some embodiments, the display features and/or characteristics of a digital user device may be dynamically set/changed/configured/transformed based on a combination of one or more inputs and/or parameters. Inputs and/or parameters, in accordance with embodiments may include: (1) a definition of a 'Virtual Lens' including a profile, a shape, contrast level(s), filtering of color, shade, hues, and/or other visual features—to take effect over a specific area of the digital user device's display, as part of its dynamic setting/changing/configuring: (2) user focal point data, dynamically indicating the coordinates of specific spot/area over the digital user device's display, at which the user's view/eyes is/are directed: (3) user provided diopter and/or optical prescription values; and/or (4) distance of the user's eyes from the digital user device's display, dynamically calculated as described herein.

'Virtual Lens' (Local Filter)

A 'Virtual Lens', in accordance with embodiments, to virtually simulate a physical lens between a user's eyes and the device's display, may define a transformation of digital-display/pixels according to any combination of: the outcome of an ophthalmologic equation that may be calculated as presets or generated substantially in real time, according to the user's optical prescription: the user's face/eyes distance from device's display; and/or and in conjunction with user selected/adjustable preferences.

A system generated/applied 'Virtual Lens', in accordance with embodiments, may include the following features: A Profile-defining the cross-section of the lens, for example, wherein the thicker/fatter/more-elevated cross-section the area of the lens, the greater its magnification level is: A Shape-defining the shape of the entire area/perimeter of the display in which the transformation by the 'Virtual Lens' is to take effect, for example a circle, an ellipse, an oval shape, a box with round edges, or other: A Shape Scale-defining the size of the defined shape, such as the size of circle, ellipse or other shape over the display.

User Focal Point

According to some embodiments, an eye-tracking module—proprietary, or based on third-party or open-source software—may track the user's eyes to estimate the user's main focal point, focal area, or Active Area of Interest (AAOI), over the display. The user's focal point may be used to determine a position/center-point/reference-point over the display at which the 'virtual lens'—in its defined profile, shape, and shape scale—will be rendered.

According to some embodiments, in order to stabilize focal point movement while in steady/constant motion and/or to overcome the eyes constant pupil scanning of peripheral vison, pupil motion normalization algorithm(s), including motion optimization and/or movement-noise reduction may be applied. The user's focal point, or point of interest, may for example be provided/represented as X and Y coordinates over the display.

User Environment Analysis

According to some embodiments, an environment analysis module may be adapted to monitor environmental/ambient conditions (e.g. light levels) at the user's surroundings to tune/adapt/adjust the characteristics of the 'virtual lens', based thereof.

Environment monitoring, in accordance with embodiments, may be based on any combination of: (1) direct monitoring of the conditions at, or in proximity, to the user—for example, based on light levels detected by the user's device's camera; and/or (2) based on monitoring of user eyes and eye region to detect and classify specific eye region behaviors and, to correlate the detected/classified eye region behaviors with, and execute, specific 'virtual lens' transformation(s) associated with the detected eye region behavior.

According to some embodiments, one or more 'virtual lens' transformation characteristics, such as the lens' magnification level, may be user adjusted and dynamically tuned based on any combination of detected environment factors/conditions, user parameters adjusted/provided through the mobile device's application interface, and/or optionally in combination with any other 'virtual lens' defining inputs/parameters as described herein.

An environmental analysis, in accordance with embodiments, may factor/assess any combination of values, changes and/or trends, of the following environment characteristics and/or environmentally-affected-user-characteristics: eye color contrast, head facing direction, lighting conditions, environmental stability, additional sensory data, enhanced eye tracking, eye and eyelid behavior, eye peripheral behavior (skin, tendons, blood vessels, wrinkles, etc.). In addition/combination behavior of the user's upper lid, brow, caruncle, near lower lacrimal punctum, conjunctiva, outer canthus, inner canthus, sclera, limbus, iris and/or pupil may be factored.

User Diopter and Prescription

According to some embodiments, user provided diopter and/or optical prescription, may be factored as part of 'virtual lens' definition/characterization. For example, the level of zoom/magnification of the generated 'virtual lens' transformation may be proportional to the user provided diopter value.

User-Display Distance and Interrelation

According to some embodiments, the distance of the user's eyes from the digital user device's display may be calculated/estimated, as described herein and/or using a third-party screen-face distance algorithm/module. For example, the level of magnification of the generated 'virtual lens' transformation may be proportional to the calculated/estimated distance.

According to further embodiments, the angle between the norm/plane of the user device's screen and the norm/plane of user's face may be calculated/approximated and factored to affect the 'virtual lens' transformation parameters/characteristics, in order to tune and support cases of substantially extreme (e.g. a sharp angle) viewing angles. Distance and/or angle based transformation tuning, in accordance with embodiments, may be adjusted prior to the application of normalization and movement optimization algorithm(s) as described herein.

User Behavior Analysis

According to some embodiments, a user behavior module may be adapted for monitoring and logging user behavior parameters and, to train a predictive AI model, and utilize trained model predictions, to forecast upcoming user behavior and provide faster/predictive/tuned/streamlined execution of visual features effects of the 'virtual lens', based thereon. For example, model predictions may be utilized to dynamically match/correspond the 'virtual lens' parameters to the model-learned reading pace of the user, to generate a steady/streamline movement of text reading. Accordingly, user behavior awareness and acknowledgment may be generated and utilized to respond/react to specific user behaviors such as break of focus, when the user moves to a next/other display item (e.g. from picture to text or vice versa).

A user behavioral analysis, in accordance with embodiments, may factor/assess any combination of values, changes and/or trends, of the following user characteristics: eye color contrast, head facing direction, lighting conditions, environmental stability, additional sensory data, enhanced eye tracking, eye and eyelid behavior, eye peripheral behavior (skin, tendons, blood vessels, wrinkles, etc.). In addition/combination behavior of the user's upper lid, brow, caruncle, near lower lacrimal punctum, conjunctiva, outer canthus, inner canthus, sclera, limbus, iris and/or pupil may be factored.

Cyber Security & User Authentication

According to some embodiments, a behavioral model may be analyzed/studied to provide an eye/eye-region motion-based authentication. A behavioral model, in accordance with embodiments, may be utilized to recognize a user's unique eye movement/behavior "fingerprint"/signature—based on specific-user data, collected during a predefined/dynamically-refined period of usage time. The generated user movement/behavior "fingerprint"/signature may be utilized to identify and authenticate—for the 'virtual lens' system's, and/or a third party's platform, login-in/credentials-verification.

Optical Subscription Assessment

A behavioral model/module, in accordance with embodiments, may be utilized to assess changes in a user's visual capabilities, based on a combination of the user's average/common display distance and the user's learned user behavior.

The behavioral model/module may be utilized to monitor a user's face distance to the device's display, accumulate associated data values along time, calculate a central tendency index or distribution of the values, and assess following user deviation values from the calculated index/distribution (e.g. deviation size, length along time, amplitude, frequency). One or more user distance deviations reaching or surpassing a threshold value(s), may indicate a potential vision capabilities change/degradation and may trigger a corresponding notification to the user, her optometrist, her eye doctor, and/or another person/entity.

Figure 5:
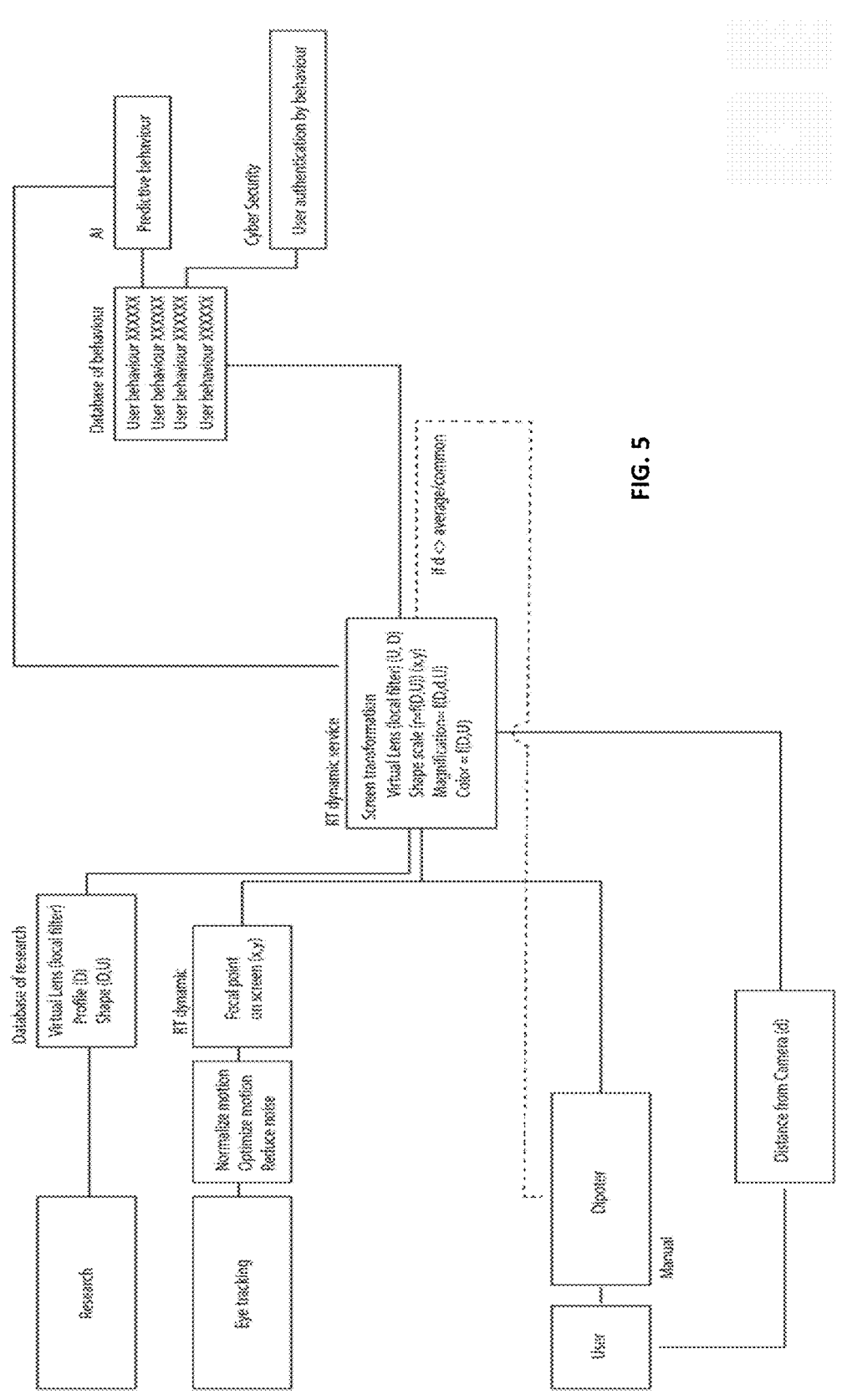
In FIG. 5, there is shown, in accordance with embodiments, a system for digital device display adjustment. In the figure, the system components, modules, and their interrelations, as described herein, are depicted.

Reference is now made to FIG. 5, where there is shown, in accordance with embodiments, a system for digital device display adjustment. In the figure, the system components, modules, and their interrelations, as described herein, are depicted.

Figure 6B:
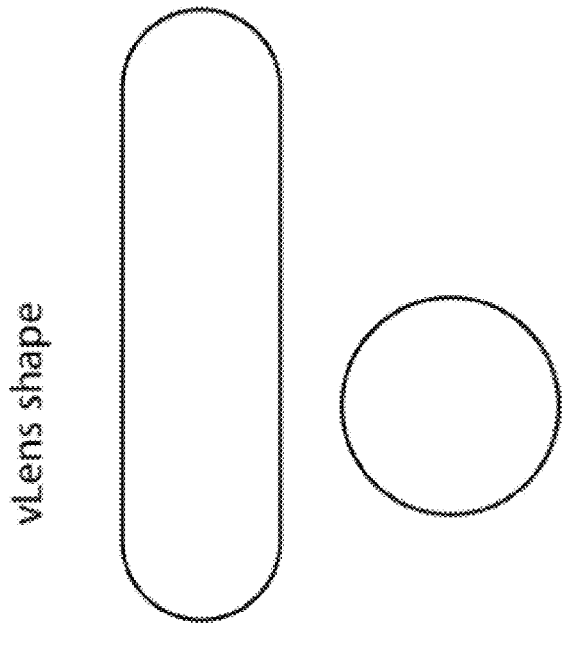
In FIG. 6B, there are shown, in accordance with embodiments, exemplary 'virtual lens' shapes.
Figure 6A:
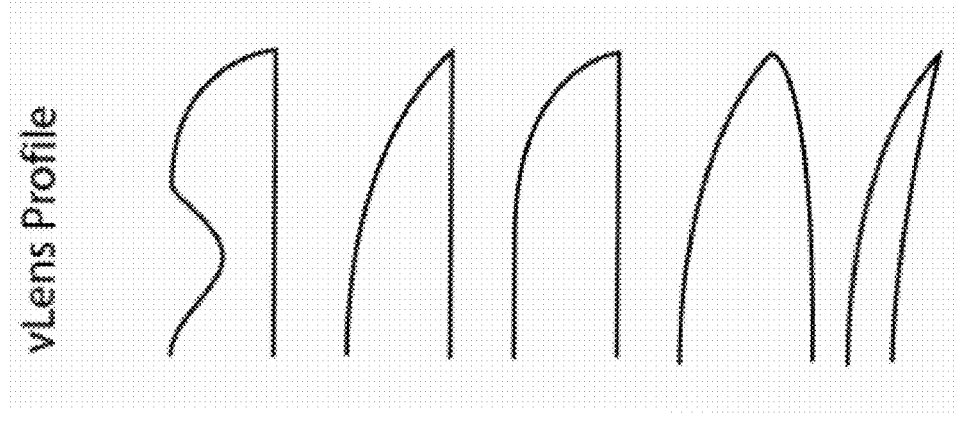
In FIG. 6A, there are shown, in accordance with embodiments, exemplary 'virtual lens' profiles.

Reference is now made to FIG. 6A, where there are shown, in accordance with embodiments, exemplary 'virtual lens' profiles.

Reference is now made to FIG. 6B, where there are shown, in accordance with embodiments, exemplary 'virtual lens' shapes.

Figure 7A:
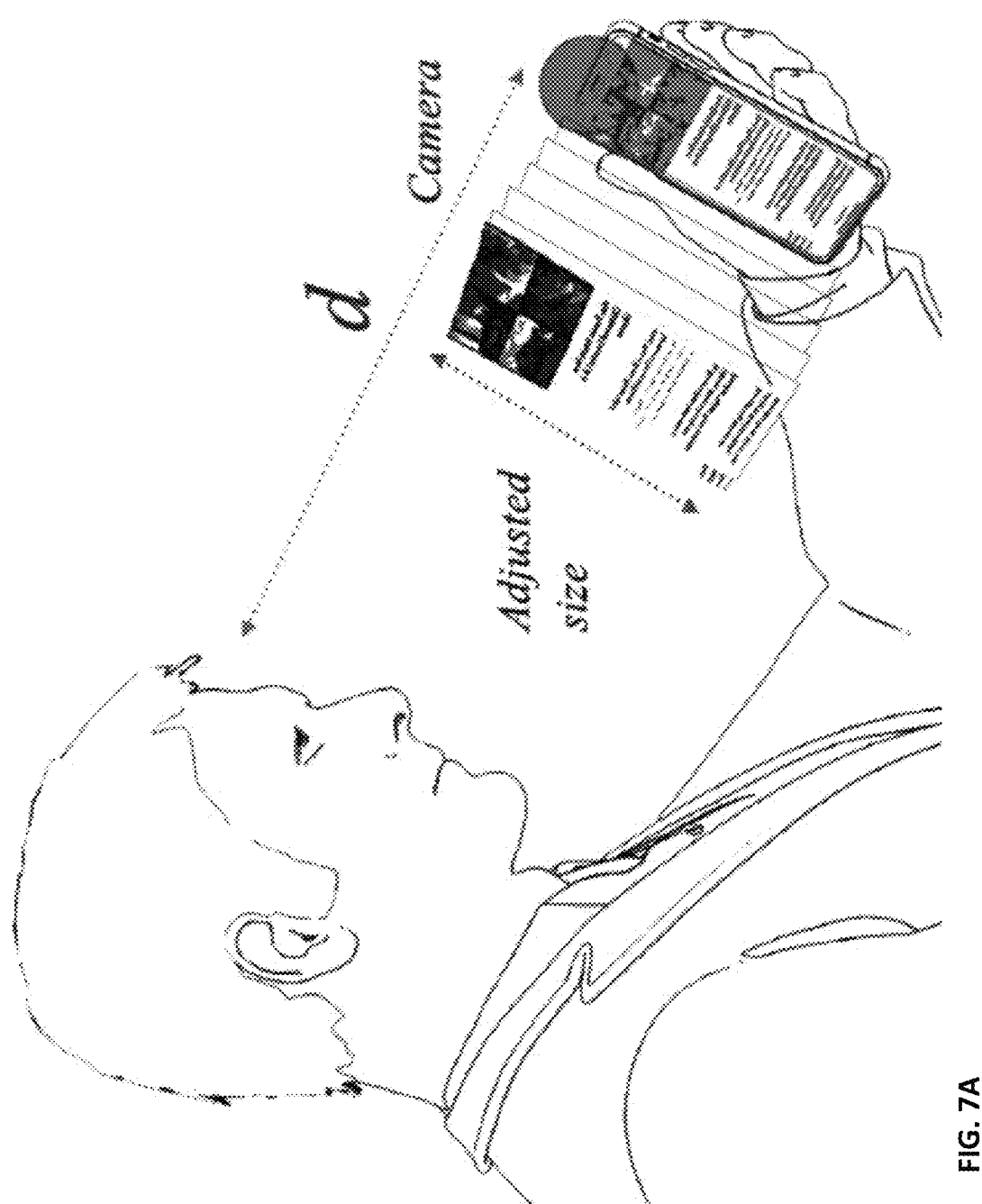
In FIG. 7A, there is shown, in accordance with embodiments, a schematic 'user face' to 'device display' distance (d) based display size adjustment/transformation.

Reference is now made to FIG. 7A, where there is shown, in accordance with embodiments, a schematic 'user face' to 'device display' distance (d) based display size adjustment/transformation.

Figure 7B:
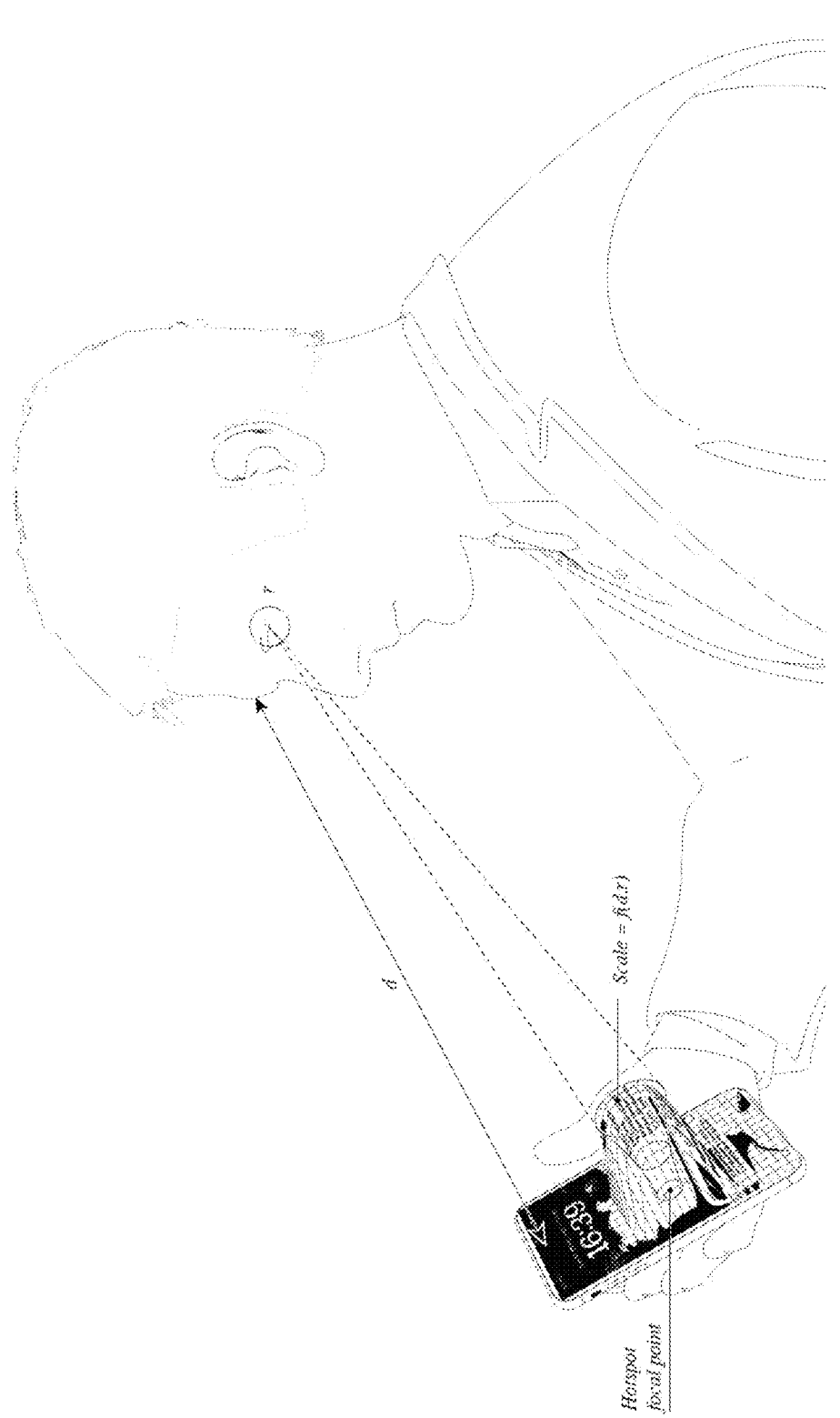
In FIG. 7B, there is shown, in accordance with embodiments, a schematic user's focal-point/hotspot based display adjustment/transformation and display adjustment/transformation positioning over the device's display—i.e. the transformation/adjustment is positioned at the estimated user's focal-point/hotspot.

Reference is now made to FIG. 7B, where there is shown, in accordance with embodiments, a schematic user's focal-point/hotspot based display adjustment/transformation and display adjustment/transformation positioning over the device's display—i.e. the transformation/adjustment is positioned at the estimated user's focal-point/hotspot.

Figure 8A:
In FIG. 8A, there is shown, in accordance with embodiments, an exemplification of a display 'virtual lens' transformation, wherein the display is shown in a pre-transformation, 'regular', state.

Reference is now made to FIG. 8A, where there is shown, in accordance with embodiments, an exemplification of a display 'virtual lens' transformation, wherein the display is shown in a pre-transformation, 'regular', state.

Figure 8B:
In FIG. 8B, there is shown, in accordance with embodiments, an exemplification of a display 'virtual lens' transformation, wherein the display is shown in a post-transformation, 'adjusted magnification', state.

Reference is now made to FIG. 8B, where there is shown, in accordance with embodiments, an exemplification of a display 'virtual lens' transformation, wherein the display is shown in a post-transformation, 'adjusted magnification', state.

Figure 8C:
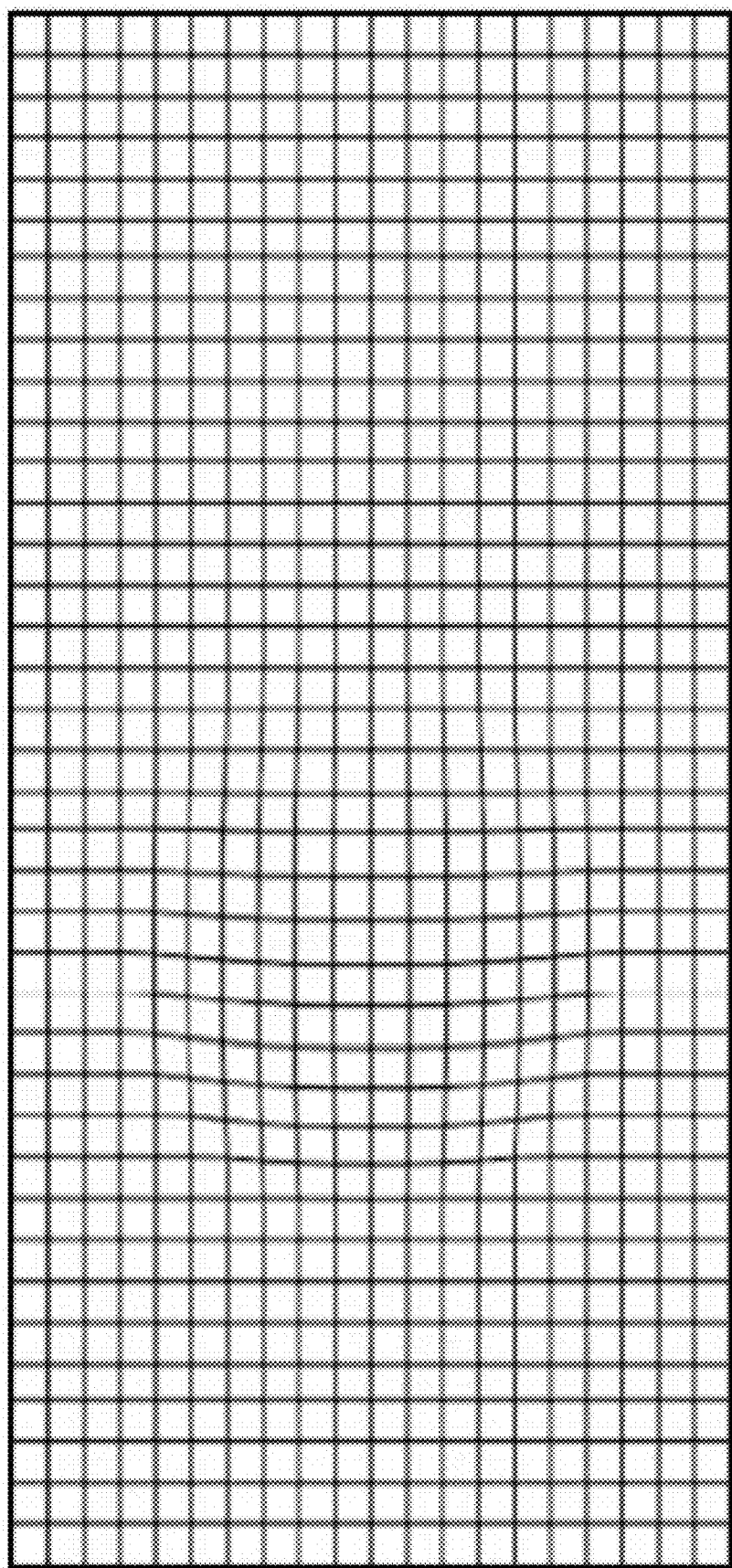
In FIG. 8C, there is shown, in accordance with embodiments, an exemplary post-transformation state magnification greed, of the device display 'virtual lens' transformation shown in FIG. 8B.

Reference is now made to FIG. 8C, where there is shown, in accordance with embodiments, an exemplary post-transformation state magnification greed, of the device display 'virtual lens' transformation shown in FIG. 8B.

According to some embodiments, a system, or a computerized application, for digital device display adjustment may include: (a) an optical calibration module-including system components and functionalities associated with defining and tunning the type and characteristics of optical changes to be made to the digital device displayed content; and (b) a focal calibration module-including system components and functionalities associated with estimating the user's view position, point of focus, and/or area of interest, over the digital device display, at which the optical changes of (a) will be made at.

Figure 9:
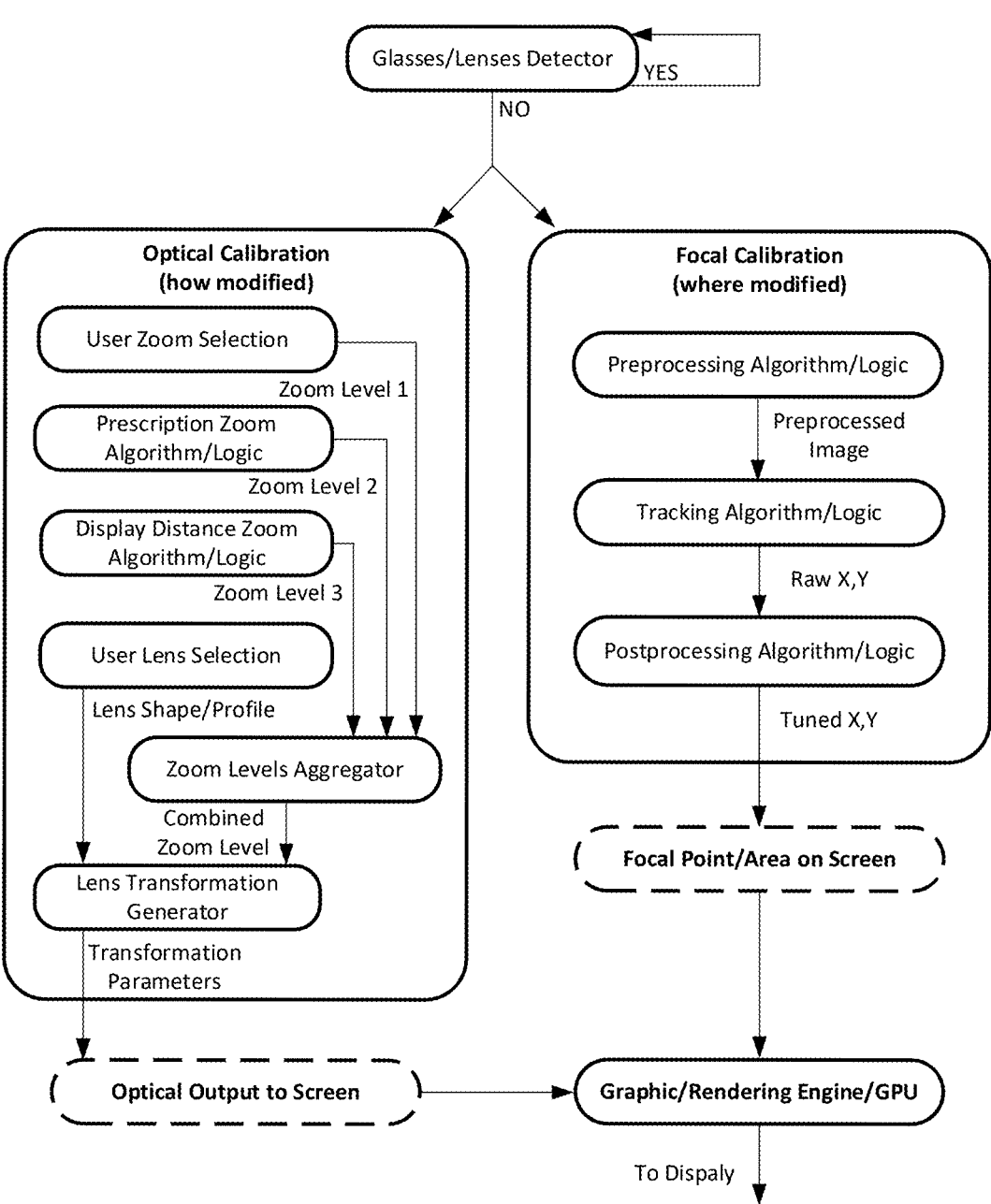
In FIG. 9, there is shown, in accordance with embodiments, an exemplary system for digital device display adjustment including an optical calibration module and a focal calibration module.

Reference is now made to FIG. 9, where there is shown, in accordance with embodiments, an exemplary system for digital device display adjustment including an optical calibration module and a focal calibration module. The exemplary embodiment shown, includes a glasses/lenses detector for intermittently acquiring (e.g. using device selfie camera) and analyzing an image of the digital device's user face/eyes, to determine and indicate whether the user is currently wearing his/her glasses or contact lenses. The detector may iterate the process, until an indication that the user is not wearing, or has removed, his optical glasses/lenses. Once a 'no glasses/lenses; indication is received, the optical and focal calibration processes are initiated.

According to some embodiments, an optical calibration process may include the calculation of multiple zoom levels and their combination—by summing, averaging, applying a measure of central tendency, and/or other method—to generate an aggregated zoom level to be applied as part of the digital device display adjustment. The optical calibration process may further include the receipt of user selections/preferences regarding the shape (virtual lens border lines) and profile (virtual lens topography/pattern) of the aggregated zoom level, to be applied. The aggregated zoom level and the user selected virtual lens' characteristics are then collectively utilized to generate, and relay, transformation parameters for the content currently being displayed over the screen of the digital device.

The optical calibration module of FIG. 9 is shown to include a combination of three zoom level value generators—based on user selection, based on the user provided eye/glasses prescription, and based on an estimation of the current distance between the user's eyes and the display of the digital device. The various zoom level indications are shown to then be aggregated to yield the combined zoom level to be rendered on the screen. Further shown are a user lens selection component, wherein the user may elect the shape and profile of the virtual lens to be rendered and displayed, by the graphic/rendering engine or graphic processing unit (GPU), on the screen of the digital device.

According to some embodiments, a focal calibration preprocess may include image analysis and manipulation based thereof, modifying the input image(s), and thereby increasing the accuracy of a following eye tracking algorithm/logic and its ability to identify a user's pupils and her gaze direction.

According to some embodiments, a focal calibration postprocess may include utilizing the eye tracking algorithm/logic's output (e.g. x, y coordinates as a function of time) to manipulate and identify focus point motion, for optimization of linear eye movement, by recognizing, and correcting or compensating for, non-linear eye/pupil movements (e.g. shifting a line, breaking the reading of a line, etc.), thereby improving tracking performance and responsiveness.

The focal calibration module of FIG. 9 is shown to include a preprocessing logic, for receiving and processing one or more device displayed image(s) (e.g. selfie image(s)) prior to their relaying to a user eye tracking algorithm or logic as inputs. The images are processed/edited in a manner/form that enhances/optimizes the tracking algorithm's/logic's ability and performance—facilitating a more accurate estimation and tracking of the user eyes' point/area of interest over the digital device's screen, by the eye tracking algorithm.

The user eye tracking algorithm or logic may be a proprietary eye tracker and/or a third-party eye tracker (e.g. a smartphone augmented reality (AR) native eye tracker). The raw eye tracker generated x, y coordinates—indicating the estimated current user's point of interest over the screen—may then be tuned by the shown postprocessing algorithm/logic to further optimize their accuracy and their matching to the user's actual focal point/interest within the content currently being displayed on the device's screen.

Figure 10A:
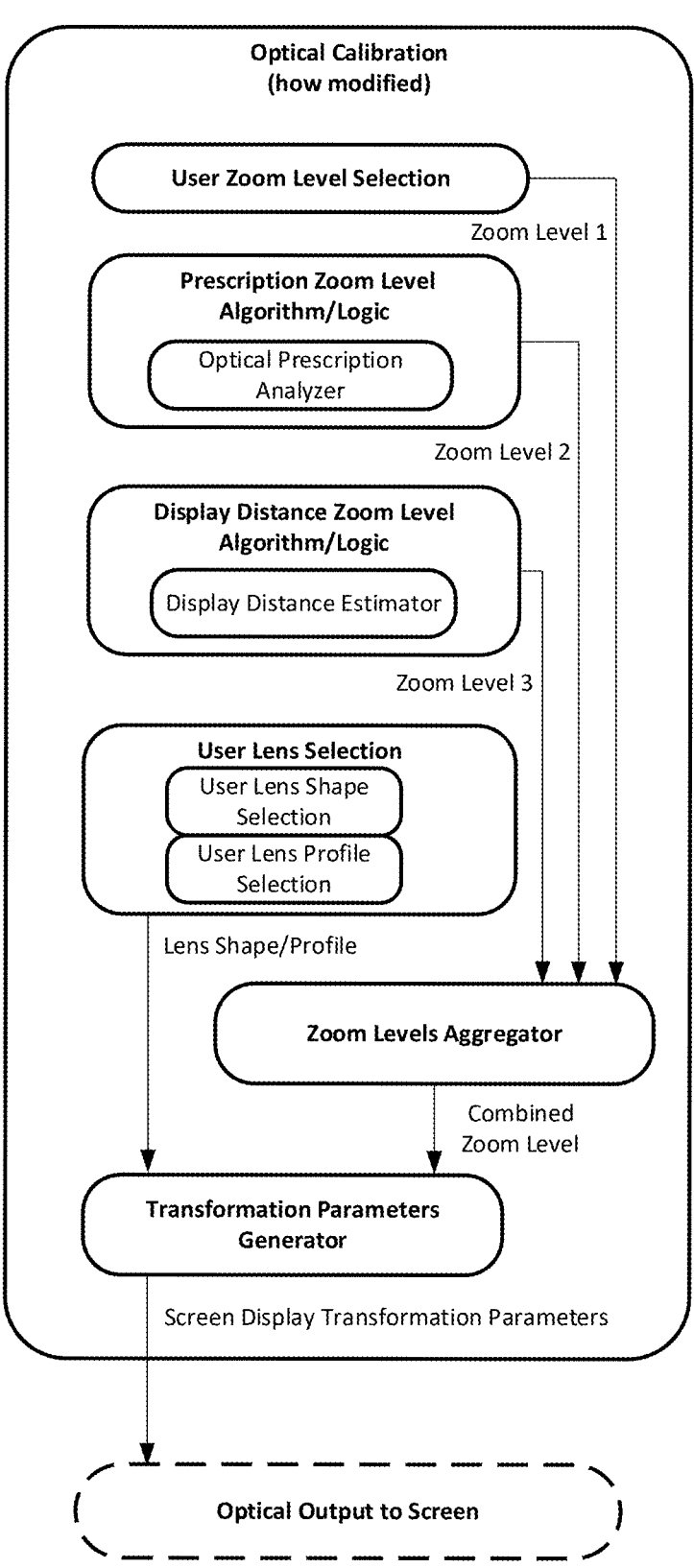
In FIG. 10A, there is shown in further detail, in accordance with embodiments, an exemplary optical calibration module; and In FIG. 10B, there is shown in further detail, in accordance with embodiments, an exemplary focal calibration module.

Reference is now made to FIG. 10A, where there is shown in further detail, in accordance with embodiments, an exemplary optical calibration module. The exemplary module's prescription zoom level algorithm/logic is shown to include an optical prescription analyzer to receive from a user of the digital device an eye prescription, determine an eye impairment condition, such as nearsighted or farsighted, and its level/value based thereof, for example two diopter nearsighted or –0.5 cylinder, and calculate a matching display adjustment/transformation such as a zoom/magnification level.

For example, when there is a minus sign in front of the diopter number, meaning the user is nearsighted. objects close to your eyes would seem clear, while those that are far away appear blurry. Accordingly, the greater the negative value the greater the matched zoom/magnification level will be.

The exemplary module's display distance zoom level algorithm/logic is shown to further include a display distance estimator for estimating the current distance between the screen of the digital device and the eyes/face of the user. The prescription and display-distance based zoom levels, optionally along with the shown user selected zoom level, are aggregated by the zoom levels aggregator to calculate a combined zoom level.

For example, a negative diopter value independently calling for a zoom/magnification increase, may be disregarded if an indication that the display distance from the user's eyes is relatively small and would have no or low effect on the nearsighted visual reading/viewing ability of the display.

The user lens selection component is shown to include a user lens shape selector for choosing a specific shape, defining the perimeter/border for the display manipulation/adjustment to take place over, as described herein. The user lens selection component is shown to further include a user lens profile selector for choosing a specific profile/topography/virtual-lens'-thickness, defining/mapping the zoom level decrement, from the combined zoom level, as the distance from the main user's point of focus over the display grows, as described herein. The shown transformation parameters generator translates/modifies the combined zoom level and the selected lens shape and profile, into screen display transformation parameters that are output/relayed to the device's screen rendering-engine/GPU for presentation.

Figure 10B:
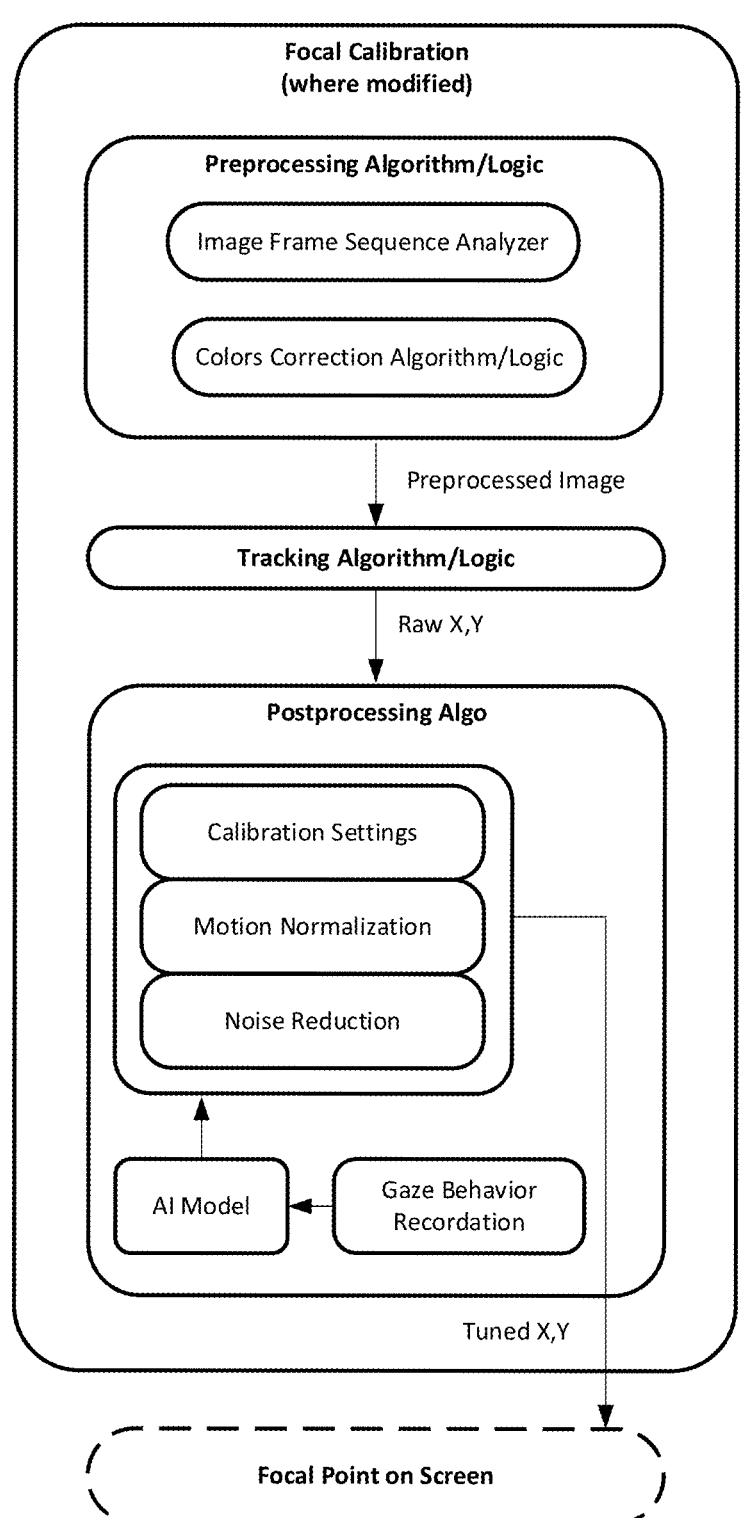

Reference is now made to FIG. 10B, where there is shown in further detail, in accordance with embodiments, an exemplary focal calibration module. The exemplary module's preprocessing algorithm/logic is shown to include an image frame sequence analyzer to receive continuous frame-set inputs (e.g. every $N^{th}$ frame), of images acquired by the digital device's front and/or selfie cameras, and analyze their lighting conditions, optionally, along with additional data—acquired during an associated/corresponding period of time—from the digital device's sensors, such as its GPS sensor/chip, infrared sensor, gyro, accelerometer, microphone, and/or other. Based on the assessed lighting conditions and sensors data, the shown colors correction algorithm/logic makes one or more modifications to the original image's characteristics to facilitate the ability of the eye Tracking Algorithm/Logic to identify and track the user's eyes and their gaze direction. Modifications to the original image may, in accordance with embodiments, include change(s) to the lightness/brightness, saturation, contrast, and/or hue, of that image.

For example, if the digital device's front camera images indicate high light levels at the device's environment, the colors correction algorithm/logic may, in response, increase the brightness and/or saturation levels to improve the eye Tracking Algorithm/Logic ability to differentiate, and thus identify and track, the user's eyes/pupils.

The exemplary module's postprocessing algorithm/logic is shown to tune the x, y focal output values arriving from the tracking algorithm/logic, by: (1) the motion normalization component normalizing the sequence values to exclude, or lower the relative weights/consideration of, one or more lowest x and y values and one or more highest x and y values received; and (2) the noise reduction component deleting/ignoring x, y values that behave/change differently from previously learned/observed normal/common/natural x, y values change patterns (e.g. values that indicate abrupt changes).

The shown gaze behavior recorder monitors and registers the user's gaze direction along time. Gaze direction values are then fed as training data to the shown AI model, to generate predictive (i.e. future) gaze direction outputs. The model's outputs may be compared—for example by a loss function—to later gathered, actual gaze direction values determined by the eye tracking algorithm/logic, and the model's weights tuned based thereon (e.g. correct gaze prediction=increase weight; wrong gaze prediction=decrease weight). The trained model's insights may then be utilized to predict future gaze characteristics—prior to receipt of actual eye tracking data—and make focal calibration changes to the presented content based thereof, thereby minimizing the system's response time.

According to some embodiments, optical/image calibration may include any process, or combination of processes, for determining one or more types and characteristics of digital image transformation of content displayed on a user's digital device's screen.

An optical/image calibration process, in accordance with embodiments, may include the presentation of an image sequence, or a video, for example at the center of a screen, presenting a word/number/image which size is increasing constantly in steps until a user action is received in response. The user may for example be presented with the message: "stop/press/indicate when you can recognize the character/image", thereby teaching the system her visual capabilities.

An optical/image calibration process, in accordance with embodiments, may include diopter prescription entry by the user and adjustment/transformation of the displayed content (e.g. its magnification level) at least partially based thereon.

An optical/image calibration process, in accordance with embodiments, may include an interactive manual including user fingers pinch motion detection, to receive user selections of optical transformation properties for the displayed content, such as the selection of user aspired magnification/zoom levels.

An optical/image calibration process, in accordance with embodiments, may include an analysis of displayed elements and magnification/zooming of only specific, and/or user-specific, element types. For example, text elements and/or fonts may be magnified/enlarged while image content remains the same size or its size is demagnified/reduced/marginalized.

An optical/image calibration process, in accordance with embodiments, may include a process of visual content element, such as an image/table, breakdown into sub elements, by utilizing an image-processing/AI algorithm/logic/model/module, and selectively manipulating only specific sub elements from within.

According to some embodiments, focal calibration may include any process, or combination of processes, for identifying/finding/calibrating the focal point, or Active Area of Interest (AAOI), of the user and translating it to screen-space coordinates in a substantially accurate manner.

A focal calibration process, in accordance with embodiments, may compensate for non-optimal, or non-perpendicular, viewing angle of the device's display-based on digital device gyro sensor info and the device's selfie camera acquired images. Device camera(s)' light sensors data may be utilized to compensate for non-optimal lighting conditions, for example, by processing acquired to change their saturation, contrast, brightness, hue, and/or other image features, prior to their input to an eye tracking algorithm or logic.

A focal calibration process, in accordance with embodiments, may include the presentation of onscreen content at various positions over the device's display, for example, its center, top right, top left, bottom right and bottom left. The user's eye behavior and gaze in response to the differently positioned content may be recorded and later utilized to correct or predict the outputs of an eye tracking algorithm/logic.

A focal calibration process, in accordance with embodiments, may be at least partially based on any combination of recording of, optionally live, raw data, such as: device selfie camera images: eye movement and pupil movement along a time period; user's focus on specific location(s) (e.g. x, y coordinates) depending on screen presented data: distance between the device's screen and the user's eyes at specific time points or along a time period: recordation of HTML (or other code), screen structure data and/or screen elements, to generate a layout profile of the content to detect elements, content types and/or other characteristics of interest or non-interest; and/or other.

A focal calibration process, in accordance with embodiments, may include an interactive instructional process, such as a step-by-step user guiding scheme, wherein user's interactions, such as 'swipes' and 'clicks', are correlated to her eye or pupil movements.

A focal calibration process, in accordance with embodiments, may include an active process, based on a user's visual reaction monitoring (e.g. eye/pupil movement) in reaction to various presented graphic elements, data types, and/or instructions.

A focal calibration process, in accordance with embodiments, may include a 'hidden' process, wherein animated content is presented and the user's visual reaction (e.g. eye/pupil movement) thereto is monitored over a time period.

A focal calibration process, in accordance with embodiments, may include an artificial intelligence (AI) based calibration correction process. An AI model may be provided with eye tracking data inputs and utilized to identify non-typical behaviors or behavior schemes, such as repetitive eye movement around a same point or area of the screen, attempt to reach specific display spots lasting beyond a predefined time period, or detection of user neck/head movements that may indicate an inaccurate calibration and degraded ability to track eye/pupil movements, behaviors and performance levels that correspond to specific times of the day, specific locations (e.g. determined by the device's GPS), specific weather conditions at the device's location, and/or other. In addition, specific user content layout may be provided to the AI model as input, for learning and generating her typical layout profile and for performance of visual behavior analysis and correlation based thereof.

A focal calibration process, in accordance with embodiments, may include a process for the removal of user blinking-related interruptions, and/or a process for the removal or reduction of eye tracking noise.

A focal calibration process, in accordance with embodiments, may include a process for analyzing the user pupil normal and/or its relative angle to that of the digital device's screen, to generate and/or position displayed content transformation based thereof. As part of the process, a combination of the following data types may be utilized: the angle of the device/smartphone to horizon: the Pitch/Roll/Yaw of the device's camera on (X, Y, Z axis rotation of the device/smartphone); the user's face normal direction and user's eye/pupil normal direction: the user's eye brightness level: the lighting conditions in the operation environment: utilization of background recognition and analysis to determine the environment/horizon behind the user, in order to evaluate the user's head relative position/rotation; detection of "anchors" such as the user's shoulders, head, face, and/or other; motion detection of the device/smartphone: calculation of relative angles of the user's body parts or organs, such as face/head tilt relative to shoulders line: reduction of noisy and/or unstable/rapidly-fluctuating user focal point data values: correction or compensation for opposite motions of the user's head and eye/pupil: calculation of main environment light sources, utilizing the device's front camera, back camera, user eye image reflection analysis, and the like, to adjust and correct eye reflection that may hinder or lower the accuracy of eye/pupil focus point estimations: image analysis and dissembling of elements to layers (extract reflection, eye object, face object, environment/floor object, light object etc.): smoothing and optimization/normalization of eye tracking movement; and/or others.

According to some embodiments, a system or application for digital device display adjustment, as part of collected raw data analysis and analysis conclusion/outcome implementation, may include the utilization of: AI calibration correction: visual degradation detection and referral to an optical eye exam, for example, upon monitoring indication of an increased distance of user screen view: recognition of users according to their specific "eye gaze motion" behavior as a personal/biometric "fingerprint": recognition of a type, brand, make, and/or model of a user's eyeglasses or its frame.

According to some embodiments, a system or application for digital device display adjustment installed on a digital device: may constantly work/run in the background and may operate as a layer filter: may take the form of a cloud connected Saas (Software as a Service) SDK (Software Development Kit) integrated into mobile apps, operating systems, or any software using its own API: may facilitate cross device personalized recognition: may be installed upon a vehicle/automotive digital dashboards and may operate in conjunction with an installed in-cabin dashboard/other camera: may recognize, and optically specifically transform, subtitles substantially in real time: may include AI based real time regeneration of frame solution to split text and subtitles from one position to another, for example remove from the footage of a screen and recreate on the top of the screen and, may further include Application Programing Interface (API) access to subtitles, to increase size according to user diopter: may implement a screen to user face/eyes distance based magnification level: may be triggered automatically and hands free, triggered only upon no-detection of eyeglasses/contact-lensses on user: may comprise the ability to learn and analyze a user's/person's vision habits in trivial actions (e.g. opening a page, unlocking a phone, responding to messages, reading content) facilitating the creation of a personalized vision behavior profile that will later enable user/personal identity: may adjust tracking speed/damping/normalization according to content type: may implement a logarithmic/exponential/linear incrementation of AAOI based on user identity/version.

According to some embodiments of the present invention, a computerized system or application for digital device display adjustment, may comprise: (1) an optical calibration module for determining one or more characteristics of an optical adjustment to digital visual content displayed over the screen of the digital device; and (2) a focal calibration module for: (a) utilizing an eye tracking logic to determine a user's point of focus over the screen of the digital device; and (b) relaying an indication of the user's point of focus, and the optical adjustment characteristics, to a graphic processor of the digital device for rendering the optical adjustment at a location, over the digital device's screen, indicated by the determined user's point of focus.

According to some embodiments, the optical adjustment may include magnification of a specific area, of the displayed visual content, indicated by the determined user's point of focus over the screen.

According to some embodiments, the system/application may further comprise an eye optical prescription analyzer for: receiving a user's eye prescription: extracting one or more prescription records; and setting a level for the magnification matching the extracted prescription records.

According to some embodiments, the system/application may further comprise a display distance estimator for: estimating a current distance between the digital device user's eyes and the screen of the device; and factoring the estimated distance as part of setting the level of the magnification.

According to some embodiments, the system/application may further comprise a user lens selector for: receiving a user elected shape or profile of a virtual lens; and rendering the specific magnified area to match the elected virtual lens shape or profile.

According to some embodiments, the focal calibration module of the system/application may include a preprocessing logic for: receiving an image frame sequence from a selfie camera of the digital device: analyzing the image frames to determine a lighting condition at the environment of the digital device: making one or more modifications, matching the determined lighting condition, to the image frames; and relaying the modified image frames to the eye tracking logic to determine a user's point of focus over the screen of the digital device.

According to some embodiments, the determined lighting condition may be abundance of light, and its matching image frames modification may be an increment of the image frames color levels, contrast, exposure, or saturation.

According to some embodiments, a sequence of eye tracking logic determined values, representing two or more consecutive user's points of focus over the screen of the digital device along time, may be fed as input data to an AI predicative model; and the AI predictive model may be configured/trained to output one or more predicted values indicative of following user's points of focus over the screen of the digital device.

According to some embodiments, the focal calibration module may include: a postprocessing logic for receiving a sequence of values representing a user's points of focus over the screen of the digital device along time; and a motion normalizer for excluding, or lowering the relative weights of, one or more of the lowest or highest received values.

According to some embodiments, the system/application may further comprise a biometric eye-movement authentication logic for: repeatedly receiving from the eye tracking logic, for a specific user, two or more time-consecutive points of focus over the screen of the digital device: generating a biometric "fingerprint" of a typical 'points of focus' path, of the specific user: comparing the generated typical 'points of focus' path to a newly acquired 'points of focus' path, of the same user; and authenticating the user if the similarity level between the typical and the new 'points of focus' path is greater than a threshold level.

According to some embodiments of the present invention, a method for digital device display adjustment, may comprise: determining one or more characteristics of an optical adjustment to digital visual content displayed over the screen of the digital device: utilizing an eye tracking logic to determine a user's point of focus over the screen of the digital device; and relaying an indication of the user's point of focus, and the optical adjustment characteristics, to a graphic processor of the digital device for rendering the optical adjustment at a location, over the digital device's screen, indicated by the determined user's point of focus.

According to some embodiments, the optical adjustment may include magnification of a specific area, of the displayed visual content, indicated by the determined user's point of focus over the screen.

According to some embodiments, the method may further comprise: receiving a user's eye prescription: extracting one or more prescription records; and setting a level for the magnification matching the extracted prescription records.

According to some embodiments, the method may further comprise: estimating a current distance between the digital device user's eyes and the screen of the device; and factoring the estimated distance as part of setting the level of the magnification.

According to some embodiments, the method may further comprise: receiving a user elected shape or profile of a virtual lens; and rendering the specific magnified area to match the elected virtual lens shape or profile.

According to some embodiments, the method may further comprise: receiving an image frame sequence from a selfie camera of the digital device; analyzing the image frames to determine a lighting condition at the environment of the digital device: making one or more modifications, matching the determined lighting condition, to the image frames; and relaying the modified image frames to the eye tracking logic to determine a user's point of focus over the screen of the digital device.

According to some embodiments, the determined lighting condition may be abundance of light, and its matching image frames modification may be an increment of the image frames color levels, contrast, exposure, or saturation.

According to some embodiments, the method may further comprise: feeding as input data to an AI predicative model a sequence of eye tracking determined values, representing two or more consecutive user's points of focus over the screen of the digital device along time; and configuring/ training the AI predictive model to output one or more predicted values indicative of following user's points of focus over the screen of the digital device.

According to some embodiments, the method may further comprise: receiving a sequence of values representing a user's points of focus over the screen of the digital device along time; and excluding, or lowering the relative weights of, one or more of the lowest or highest received values.

According to some embodiments, the method may further comprise: repeatedly receiving, for a specific user, two or more time-consecutive points of focus over the screen of the digital device: generating a biometric "fingerprint" of a typical 'points of focus' path, of the specific user, comparing the generated typical 'points of focus' path to a newly acquired 'points of focus' path, of the same user, and authenticating the user if the similarity level between the typical and the new 'points of focus' path is greater than a threshold level.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A computerized system for digital device display adjustment, said system comprising:
   an eye optical prescription analyzer for:
      receiving a user's eye prescription;
      extracting one or more prescription records; and
      setting a level of magnification matching the extracted prescription records;
   an optical calibration module for determining one or more characteristics of an optical magnification to digital visual content displayed over the screen of the digital device, factoring the level of magnification set by said optical prescription analyzer; and
   a focal calibration module for:
   utilizing an eye tracking logic to determine a user's point of focus over the screen of the digital device; and
   relaying an indication of the user's point of focus, and the optical magnification characteristics, to a graphic processor of the digital device for rendering the optical magnification at a location, over the digital device's screen, indicated by the determined user's point of focus.

2. The system for digital device display adjustment according to claim 1, further comprising a display distance estimator for:
   estimating a current distance between the digital device user's eyes and the screen of the device; and
   factoring the estimated distance as part of setting the level of the magnification.

3. The system for digital device display adjustment according to claim 2, further comprising a user lens selector for:
   receiving a user elected shape or profile of a virtual lens; and
   rendering the specific magnified area to match the elected virtual lens shape or profile.

4. The system for digital device display adjustment according to claim 1, wherein said focal calibration module includes a preprocessing logic for:
   receiving an image frame sequence from a selfie camera of the digital device;
   analyzing the image frames to determine a lighting condition at the environment of the digital device;
   making one or more modifications, matching the determined lighting condition, to the image frames; and
   relaying the modified image frames to said eye tracking logic to determine a user's point of focus over the screen of the digital device.

5. The system for digital device display adjustment according to claim 4, wherein the determined lighting condition is abundance of light, and its matching image frames modification is an increment of the image frames color levels, contrast, exposure, or saturation.

6. The system for digital device display adjustment according to claim 4, wherein:
   a sequence of eye tracking logic determined values, representing two or more consecutive user's points of focus over the screen of the digital device along time, is fed as input data to an AI predicative model; and
   said AI predictive model is trained to output one or more predicted values indicative of following user's points of focus over the screen of the digital device.

7. The system for digital device display adjustment according to claim 4, wherein said focal calibration module includes:
   a postprocessing logic for receiving a sequence of values representing a user's points of focus over the screen of the digital device along time; and
   wherein said postprocessing logic includes a motion normalizer for excluding, or lowering the relative weights of, one or more of the lowest or highest received values.

8. A computerized system for digital device display adjustment and user authentication, said system comprising:
   an optical calibration module for determining one or more characteristics of an optical adjustment to digital visual content displayed over the screen of the digital device;
   a focal calibration module for:
   utilizing an eye tracking logic to determine a user's point of focus over the screen of the digital device; and
   relaying an indication of the user's point of focus, and the optical adjustment characteristics, to a graphic processor of the digital device for rendering the optical adjustment at a location, over the digital device's screen, indicated by the determined user's point of focus; and
   a biometric eye-movement authentication logic for:
   repeatedly receiving from said eye tracking logic, for a specific user, two or more time-consecutive points of focus over the screen of the digital device;
   generating a biometric "fingerprint" of a typical 'points of focus' path, of the specific user;
   comparing the generated typical 'points of focus' path to a newly acquired 'points of focus' path, of the same user; and authenticating the user if the similarity level between the typical and the new 'points of focus' path is greater than a threshold level.

9. A method for digital device display adjustment, comprising:

receiving a user's eye prescription;

extracting one or more prescription records;

setting a level for the magnification matching the extracted prescription records;

determining one or more characteristics of an optical magnification to digital visual content displayed over the screen of the digital device, factoring the set level of magnification matching the extracted prescription records;

utilizing an eye tracking logic to determine a user's point of focus over the screen of the digital device; and relaying an indication of the user's point of focus, and the optical magnification characteristics, to a graphic processor of the digital device for rendering the optical magnification at a location, over the digital device's screen, indicated by the determined user's point of focus.

10. The method for digital device display adjustment according to claim 9, further comprising:

estimating a current distance between the digital device user's eyes and the screen of the device; and factoring the estimated distance as part of setting the level of the magnification.

11. The method for digital device display adjustment according to claim 10, further comprising:

receiving a user elected shape or profile of a virtual lens; and rendering the specific magnified area to match the elected virtual lens shape or profile.

12. The method for digital device display adjustment according to claim 9, further comprising:

receiving an image frame sequence from a selfie camera of the digital device;

analyzing the image frames to determine a lighting condition at the environment of the digital device;

making one or more modifications, matching the determined lighting condition, to the image frames; and relaying the modified image frames to the eye tracking logic to determine a user's point of focus over the screen of the digital device.

13. The method for digital device display adjustment according to claim 12, wherein the determined lighting condition is abundance of light, and its matching image frames modification is an increment of the image frames color levels, contrast, exposure, or saturation.

14. The method for digital device display adjustment according to claim 12, further comprising:

feeding as input data to an AI predicative model a sequence of eye tracking determined values, representing two or more consecutive user's points of focus over the screen of the digital device along time; and training the AI predictive model to output one or more predicted values indicative of following user's points of focus over the screen of the digital device.

15. The method for digital device display adjustment according to claim 12, further comprising:

receiving a sequence of values representing a user's points of focus over the screen of the digital device along time; and excluding, or lowering the relative weights of, one or more of the lowest or highest received values.

16. A method for digital device display adjustment and user authentication, comprising:

determining one or more characteristics of an optical adjustment to digital visual content displayed over the screen of the digital device;

utilizing an eye tracking logic to determine a user's point of focus over the screen of the digital device; and relaying an indication of the user's point of focus, and the optical adjustment characteristics, to a graphic processor of the digital device for rendering the optical adjustment at a location, over the digital device's screen, indicated by the determined user's point of focus;

repeatedly receiving, for a specific user, two or more time-consecutive points of focus over the screen of the digital device;

generating a biometric "fingerprint" of a typical 'points of focus' path, of the specific user;

comparing the generated typical 'points of focus' path to a newly acquired 'points of focus' path, of the same user; and authenticating the user if the similarity level between the typical and the new 'points of focus' path is greater than a threshold level.

* * * * *